(12) United States Patent
Giaier et al.

(10) Patent No.: US 10,252,592 B2
(45) Date of Patent: Apr. 9, 2019

(54) SUSPENSION SYSTEM INCLUDING RELEASABLE CONNECTION

(71) Applicant: Ford Global Technologies, LLC, Dearborn, MI (US)

(72) Inventors: Kevin Stanton Giaier, Sylvan Lake, MI (US); Christopher Melgar, Birmingham, MI (US); Peter Simeon Lazarevski, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 15/617,869

(22) Filed: Jun. 8, 2017

(65) Prior Publication Data
US 2018/0354327 A1 Dec. 13, 2018

(51) Int. Cl.
*B60G 3/04* (2006.01)
*B60G 7/00* (2006.01)
*B60G 7/02* (2006.01)
*B62D 21/11* (2006.01)
*B62D 21/15* (2006.01)
*B60G 3/06* (2006.01)

(52) U.S. Cl.
CPC ............... *B60G 7/001* (2013.01); *B60G 3/06* (2013.01); *B60G 7/02* (2013.01); *B62D 21/11* (2013.01); *B62D 21/155* (2013.01); *B60G 2200/142* (2013.01); *B60G 2204/143* (2013.01); *B60G 2204/40* (2013.01); *B60G 2204/4302* (2013.01); *B60G 2206/016* (2013.01)

(58) Field of Classification Search
CPC .............. B60G 7/001; B60G 2206/017; B60G 2206/122; B60G 2206/16; B60G 2206/8201; B60G 2206/82092; Y10T 29/49622
USPC ..................................... 280/124.128, 124.134
See application file for complete search history.

(56) References Cited

U.S. PATENT DOCUMENTS

| | | | | |
|---|---|---|---|---|
| 3,632,128 A | * | 1/1972 | Raidel | B60G 5/04 267/257 |
| 5,607,177 A | | 3/1997 | Kato | |
| 5,639,110 A | * | 6/1997 | Pierce | B60G 7/001 280/124.11 |
| 6,135,469 A | * | 10/2000 | Hulstein | B60G 7/02 180/24.02 |
| 6,659,479 B1 | * | 12/2003 | Raidel, II | B60G 7/02 280/124.16 |
| 7,914,025 B2 | * | 3/2011 | Mayen | B60G 3/20 280/124.109 |
| 8,056,912 B2 | * | 11/2011 | Kawabe | B60G 3/20 280/124.135 |
| 8,459,674 B2 | | 6/2013 | Mielke et al. | |
| 9,168,958 B2 | | 10/2015 | Kim et al. | |

(Continued)

FOREIGN PATENT DOCUMENTS

WO 2007112118 A2 10/2007

*Primary Examiner* — Toan C To
(74) *Attorney, Agent, or Firm* — Raymond L. Coppiellie; Bejin Bieneman PLC

(57) ABSTRACT

A vehicle includes a frame, a suspension arm, and a fastener. The fastener includes a flange and a shaft extending from the flange. The shaft engages the frame and the extension arm. A washer is on the shaft. The washer has a first surface facing the frame and a second surface facing the flange. The washer has a thickness from the first surface to the second surface, and the thickness tapers.

14 Claims, 11 Drawing Sheets

(56) References Cited

U.S. PATENT DOCUMENTS

| | | |
|---|---|---|
| 2002/0180171 A1 | 12/2002 | Hasebe et al. |
| 2006/0220330 A1* | 10/2006 | Urquidi .................... B60G 7/02 280/5.516 |
| 2008/0088105 A1 | 4/2008 | Ruehe et al. |
| 2011/0298192 A1* | 12/2011 | Yu .......................... B60G 7/001 280/124.134 |
| 2013/0241166 A1 | 9/2013 | Paintmayer et al. |
| 2017/0015264 A1 | 1/2017 | Mohrlock |

* cited by examiner

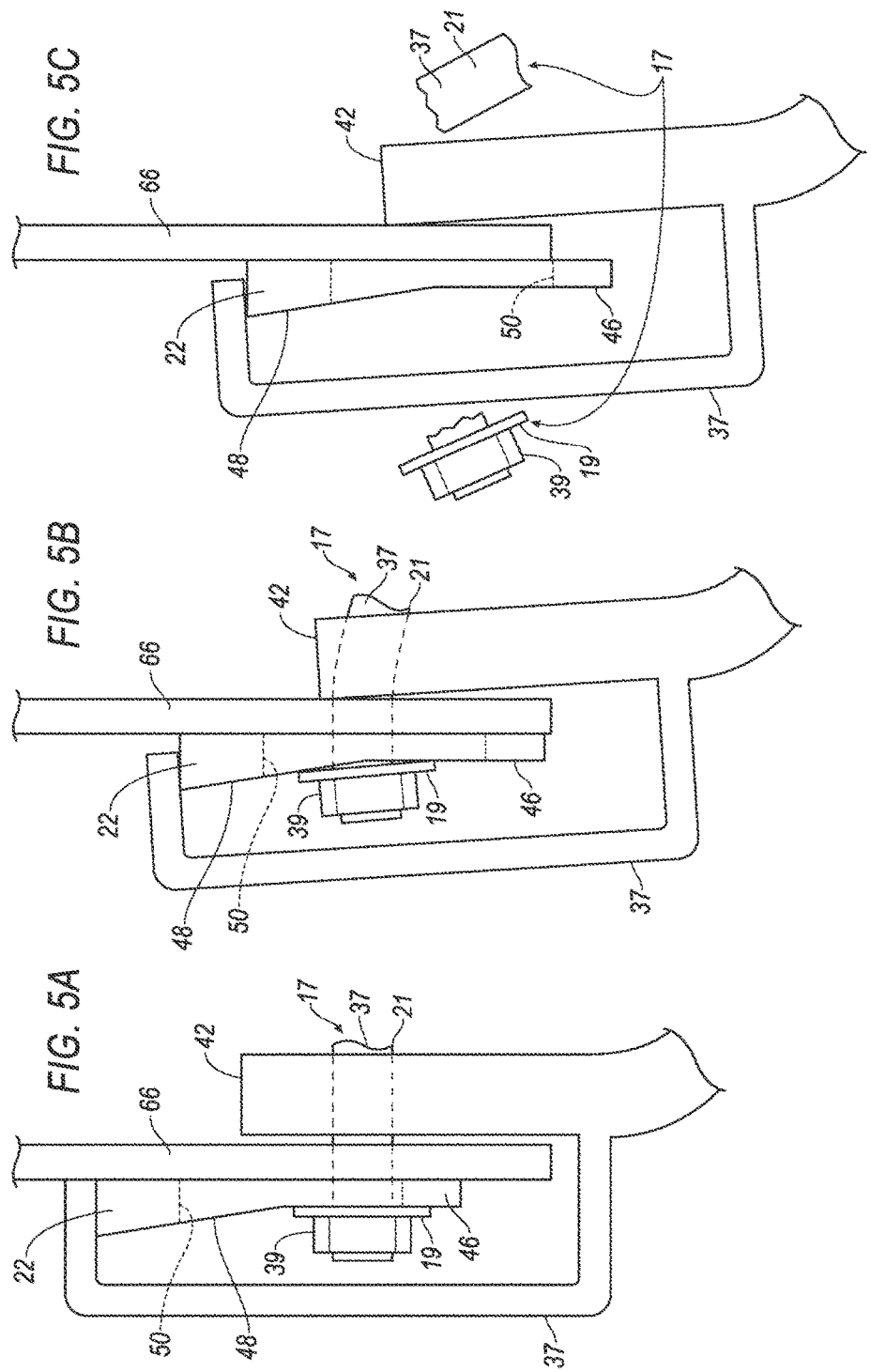

SUSPENSION SYSTEM INCLUDING RELEASABLE CONNECTION

BACKGROUND

During an offset frontal impact of a vehicle, the direction the impact is offset from major structural components of the vehicle. Offset front impacts can be simulated with a small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

During the front impact, the wheel may rotate relative to a suspension arm, e.g., about a king pin axis or a steering axis, to a position in which the wheel is oriented with a front portion of the wheel being positioned outboard relative to a rear portion of the wheel. In this position, the wheel may be trapped between a bumper beam of the vehicle, the suspension arm, and a rear of a wheel well of the vehicle. As the bumper beam moves toward the rear of the wheel well, the bumper and/or other components of the vehicle may force the wheel to intrude into a passenger compartment of the vehicle, e.g., through a floor or dash of the vehicle. Intrusion of the wheel into the floor or dash of the vehicle is a metric recorded in the IIHS SORB frontal crash test.

BRIEF DESCRIPTION OF THE DRAWINGS

FIG. 5A is a top view of one example of a portion of the suspension system at a vehicle-forward end of the suspension arm during standard operation.

FIG. 5B is the top view of FIG. 5A during a vehicle impact with a washer being forced in a vehicle-outboard direction by a driver.

FIG. 5C is the top view of FIGS. 5A and 5B during the vehicle impact at a subsequent time relative to FIG. 5B after the washer has exerted sufficient tensile force on the fastener to break the fastener.

DETAILED DESCRIPTION

Figure 1:
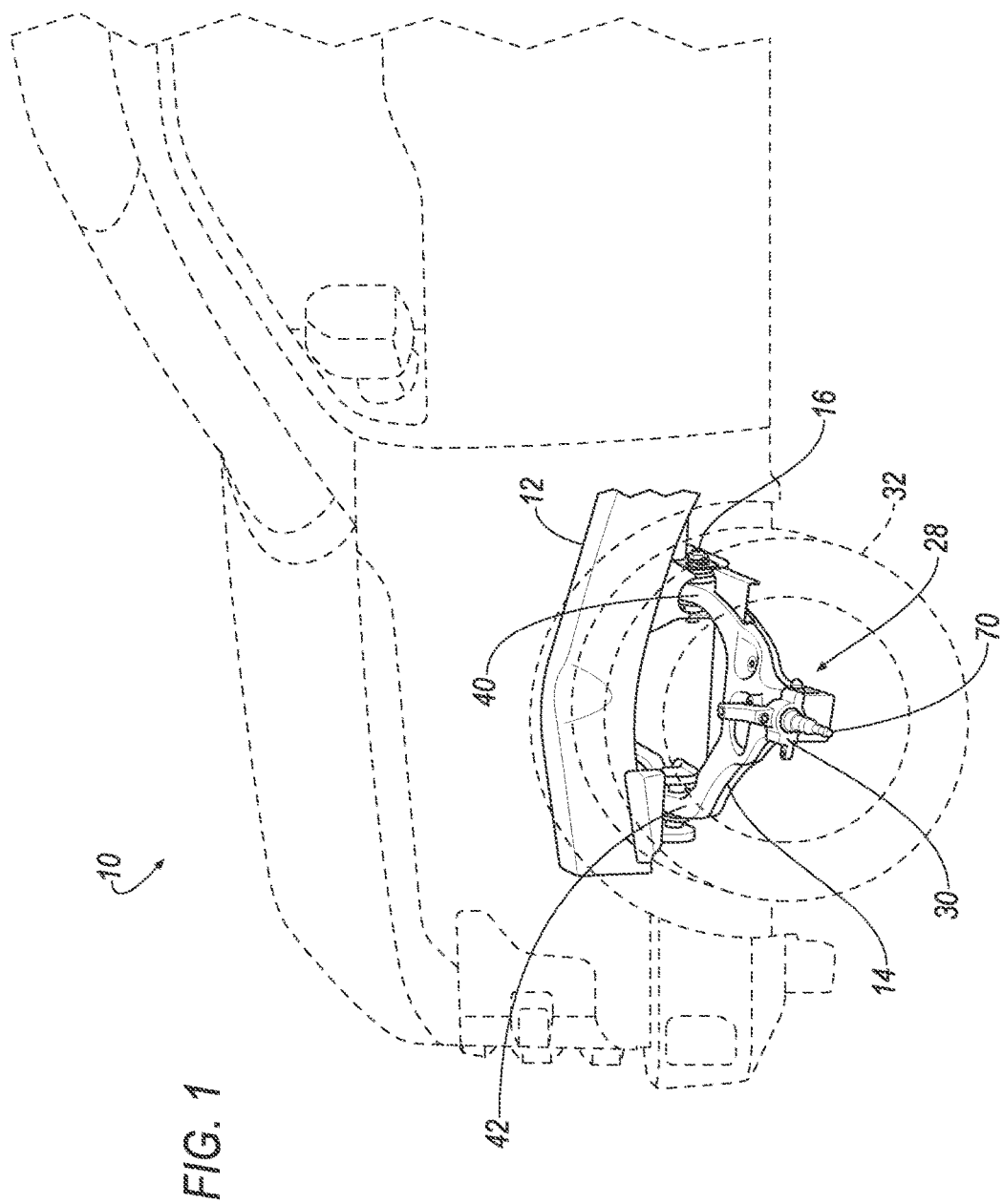
FIG. 1 is a perspective view of a vehicle including a suspension system.

A vehicle includes a frame, a suspension arm, and a fastener including a flange and a shaft extending from the flange. The shaft engages the frame and the extension arm. A washer is on the shaft. The washer has a first surface facing the frame and a second surface facing the flange. The washer has a thickness from the first surface to the second surface, and the thickness tapers.

The vehicle may include a driver positioned to impact the washer. The driver may be fixed to and extend from the suspension arm. The washer may include an impact end positioned to be impacted by the driver during a vehicle impact, and the thickness of the washer may taper in a direction from the impact end toward the flange. The driver may be spaced from the washer.

The suspension arm has a vehicle-rearward end and the driver may extends from the vehicle-rearward end.

The washer includes a flat portion between the flange and the frame, and the thickness is substantially constant along the flat portion.

The first surface may abut the frame. The second surface may abut the flange.

The fastener may include a bolt including the shaft, and a nut including the flange. The fastener includes a head, and the head includes the flange.

The washer may include a slot receiving the shaft of the fastener. The slot may be elongated along an axis and the thickness of the washer may taper in a direction along the axis. The washer may include a flat portion and a wedge portion, the flat portion being between the frame and the flange, and the thickness being substantially constant along the flat portion and tapering along the wedge portion, and the slot being disposed on the flat portion and the wedge portion.

With reference to the Figures, wherein like numerals indicate like parts throughout the several views, a vehicle 10 includes a frame 12 and a suspension arm 14. A fastener 16 includes a flange 18 and a shaft 20 extending from the flange 18. The shaft 20 engages the frame 12 and the suspension arm 14. A washer 22 is on the shaft 20 and has a first surface 24 facing the frame 12 and a second surface 26 facing the flange 18. The washer 22 has a thickness T from the first surface 24 to the second surface 26, and the thickness T of the washer 22 tapers.

Figure 2:
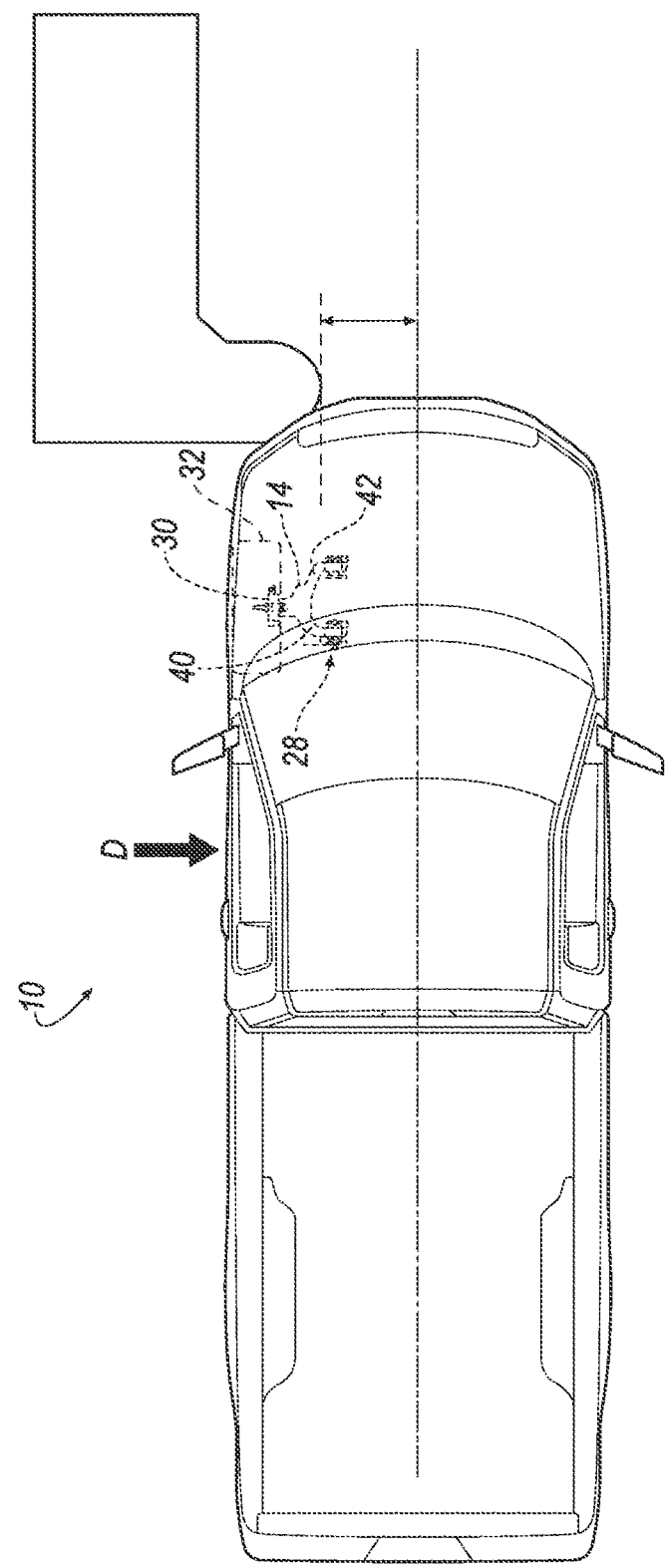
FIG. 2 is a top view of a vehicle during a small-offset rigid barrier test.
Figure 3A:
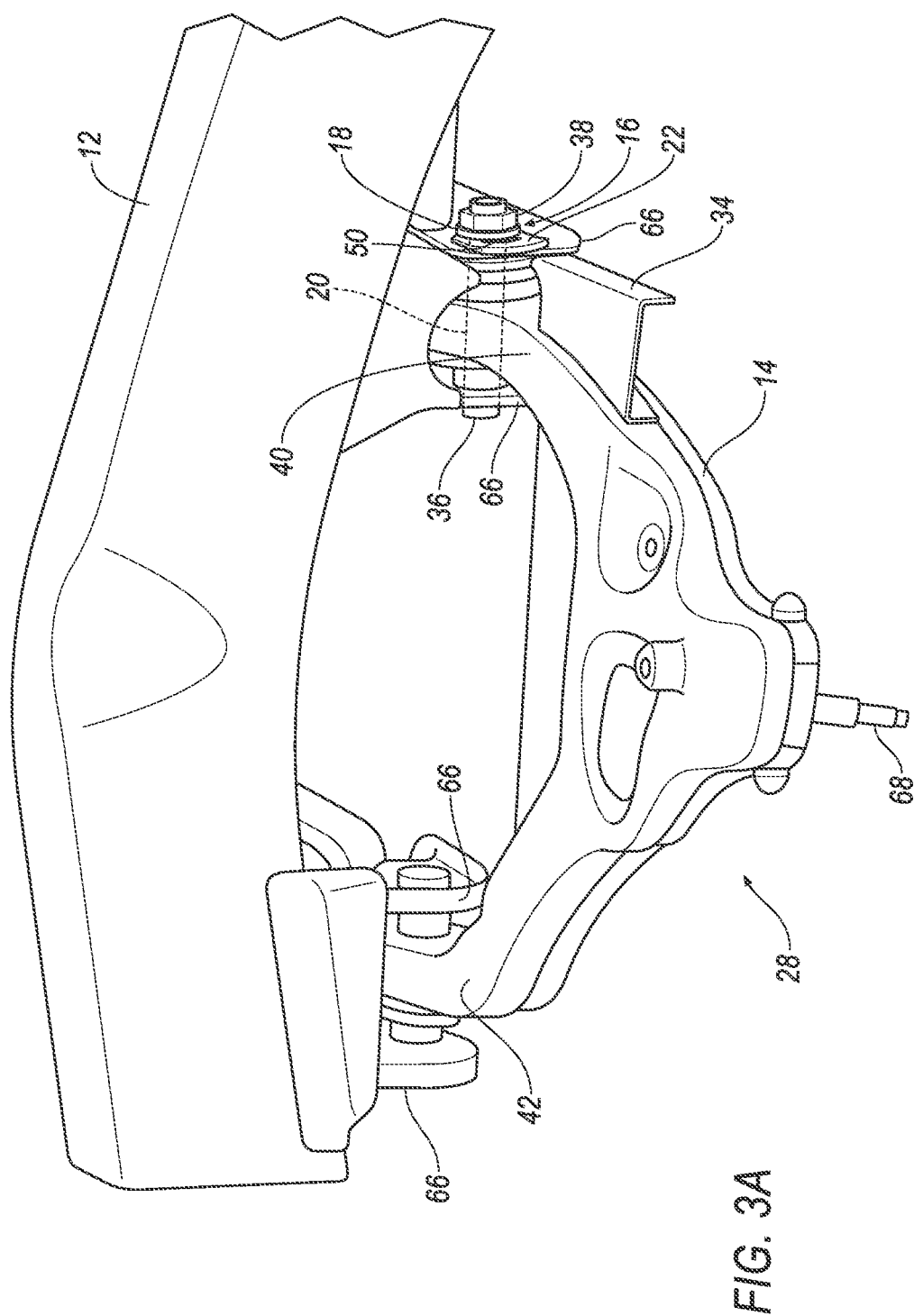
FIG. 3A is a perspective view of a portion of the suspension system during standard operation.
Figure 3B:
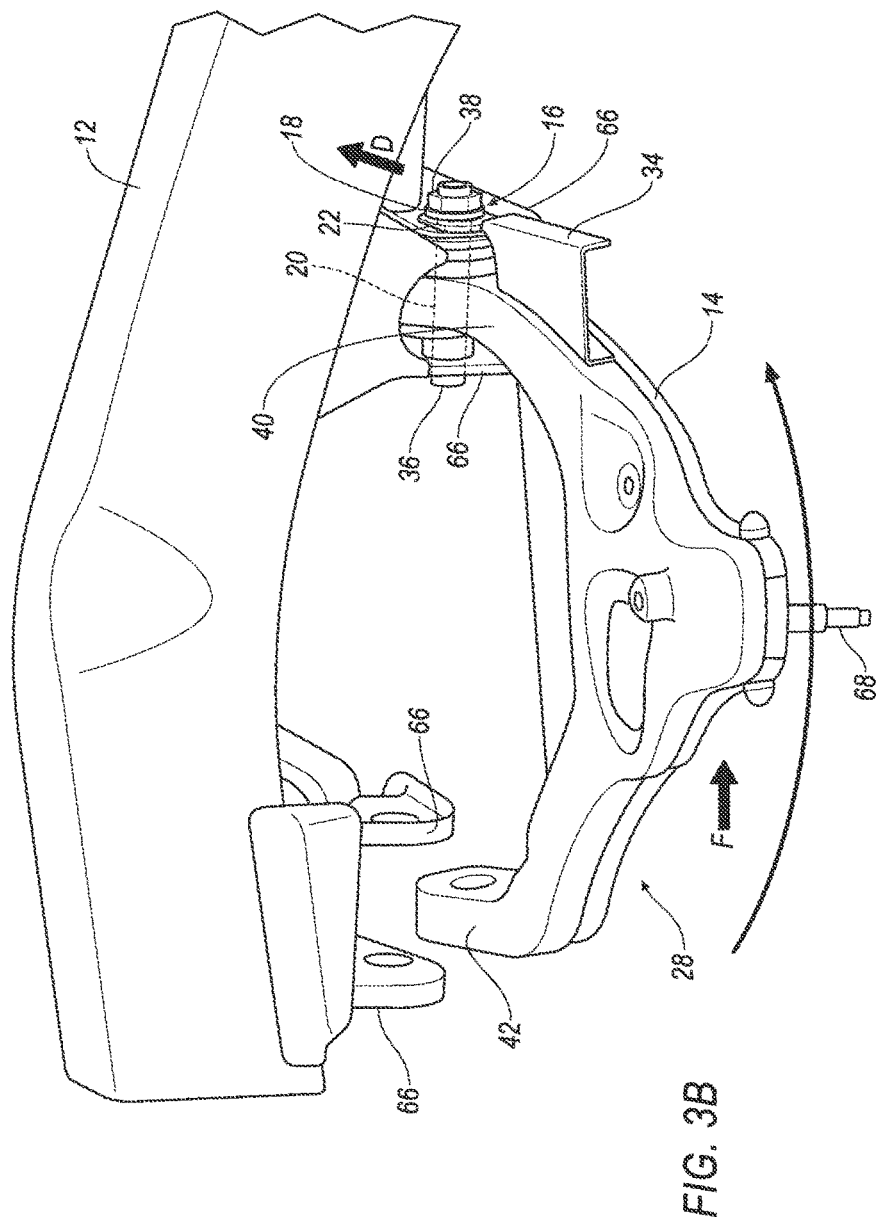
FIG. 3B is a perspective view of a portion of the suspension system during a vehicle impact with a suspension arm of the suspension system rotating relative to a frame of the vehicle.
Figure 3C:
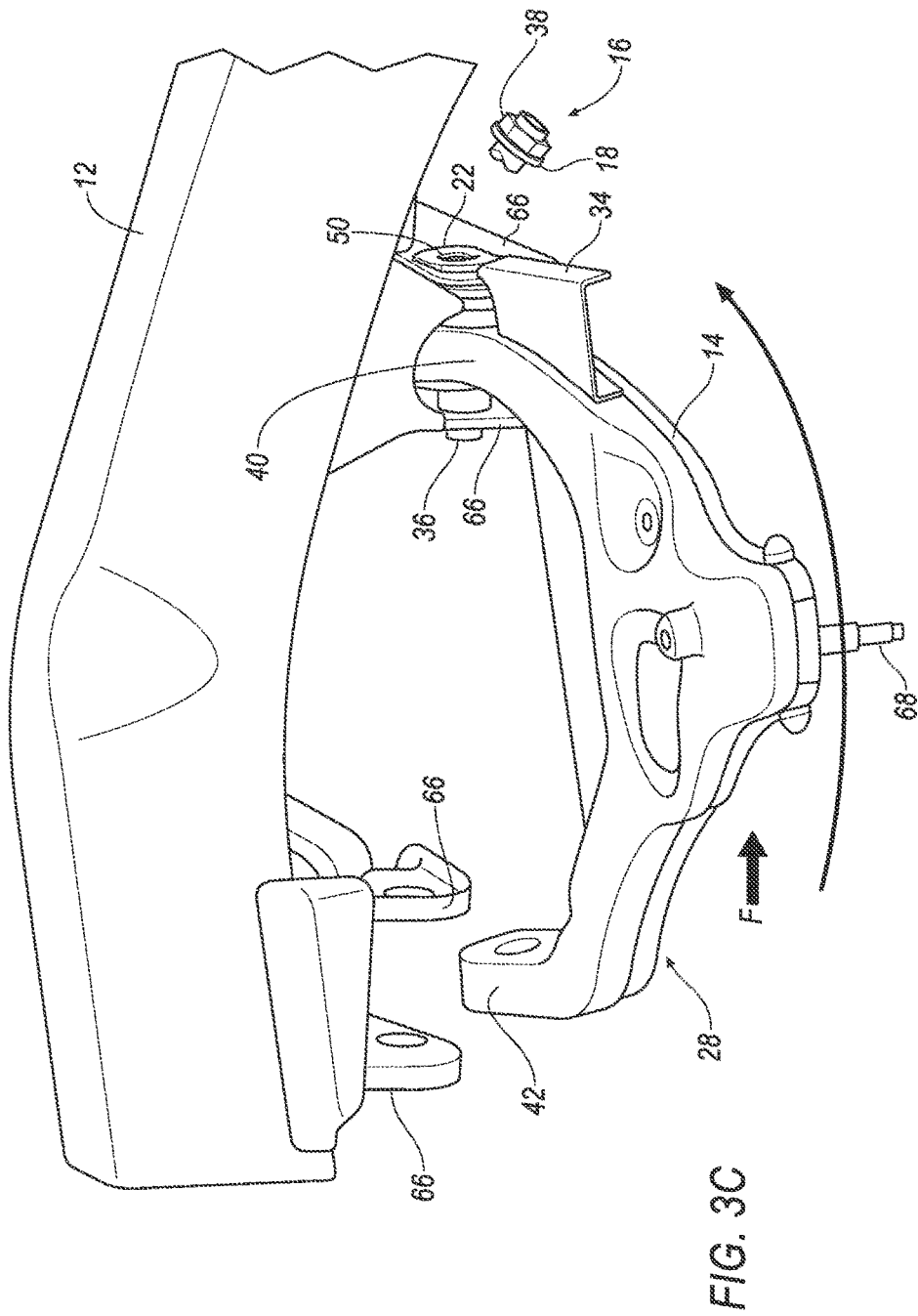
FIG. 3C is a perspective view of a portion of the suspension system during the vehicle impact at a subsequent time relative to FIG. 3B with the suspension arm further rotated relative to the frame.
Figure 4C:
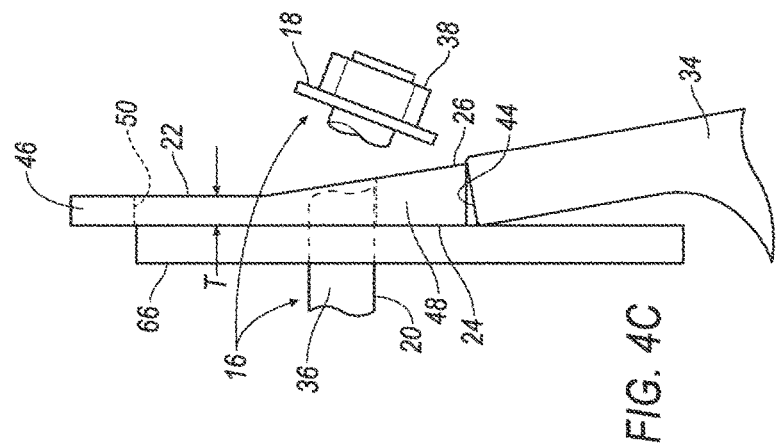
FIG. 4C is the top view of FIGS. 4A and 4B during the vehicle impact at a subsequent time relative to FIG. 4B after the washer has exerted sufficient tensile force on the fastener to break the fastener.

During an impact of the vehicle 10, e.g., the small-offset rigid-barrier (SORB) test shown in FIG. 2, the suspension arm 14 may be impacted and rotate relative to the frame 12, i.e., counter-clockwise in the view shown in FIGS. 3A-C. During rotation of the suspension arm 14, the washer 22 is driven between the frame 12 and the flange 18, as shown in FIGS. 3A-3C and 4A-4C. Since the thickness T of the washer 22 tapers, the washer 22 creates tensile forces on the fastener 16 as the washer 22 is driven between the frame 12 and the flange 18, which may ultimately break the fastener 16, as shown in FIGS. 3C and 4C. When the fastener 16 breaks, the suspension arm 14 releases from the frame 12, which reduces the likelihood of intrusion into an occupant cabin of the vehicle 10.

With reference to FIGS. 1 and 2, the vehicle 10 may be of any suitable type, e.g., a passenger automobile such as a car, truck, sport-utility vehicle 10, etc. The frame 12 may be of a unibody construction, i.e., a unitary-body construction. In the unibody construction, a body, e.g., rockers, rails, etc., serves as the vehicle frame 12, and the body (including the rockers, pillars, roof rails, etc.) is unitary, i.e., a continuous one-piece unit. In the unibody construction, the frame 12 may include a subframe that supports, for example, an engine and other components. As another example, the body and frame 12 may have a body-on-frame construction (also referred to as a cab-on-frame construction). In other words, the body and frame 12 are separate components, i.e., are modular, and the body is supported on and affixed to the frame 12. Alternatively, the body and frame 12 may have any suitable construction. The body and/or the frame 12 may be formed of any suitable material, for example, steel, aluminum, etc.

With reference to FIG. 1, the vehicle 10 includes a suspension system 28. The suspension system 28 may be, for example, a short-arm and long-arm suspension system (SLA), a MacPherson suspension system, or any other suitable type of suspension system. For example, the suspension system 28 shown in FIG. 1 is of the SLA type.

The suspension system 28 includes the suspension arm 14. The suspension arm 14 may be, for example, a control arm (such as, for example, a lower control arm) of an SLA suspension system or a MacPherson suspension system.

With continued reference to FIG. 1, the suspension system 28 may include a steering knuckle 30 connected to the suspension arm 14. Specifically, the suspension arm 14 may include a spindle 68 that engages the steering knuckle 30. In the example where the suspension system 28 includes a knuckle 30, a wheel 32 is mounted to the knuckle 30, i.e., to a spindle 70 of the knuckle 30. The suspension system 28 may include springs, struts, etc.

The suspension arm 14 is connected to the frame 12. As one example, the suspension arm 14 may be connected to the subframe. The suspension arm 14 is rotatably engaged to the frame 12. For example, the frame 12 may include clevises 66, and fasteners 16, 17 engage the suspension arm 14 and the clevises 66 to allow rotation of the suspension arm 14 relative to the clevises 66. Bushings (not numbered) may be between the suspension arm 14 and the frame 12 to allow rotation of the suspension arm 14 relative to the frame 12. The suspension arm 14 is rotatable relative to the frame 12 about the fasteners 16, 17, i.e., up and down, to allow the wheel 32 to move up and down in response to uneven road surfaces.

The fasteners 16, 17 may be of any suitable type. The suspension arm 14 has a vehicle-rearward end 40 and a vehicle-forward end 42. The vehicle-rearward end 40 and the vehicle-forward end 42 are each be connected to the frame 12, e.g., with the fasteners 16, 17 that engage the clevises 66. The fasteners 16, 17 at the vehicle-forward end 42 and the vehicle-rearward end 40 may be the same types or different types. As discussed further below, the fastener 17 at the vehicle-forward end 42 may be designed to break when the suspension arm 14 is impacted, e.g., during a SORB impact. When the fastener 17 at the vehicle-forward end 42 breaks, the suspension arm 14 is free to rotate about the vehicle-rearward end 40, which allows a driver 34 to rotate with the suspension arm 14 toward the washer 22.

With reference to FIGS. 3A-4C, the fastener 16 at the vehicle-rearward end 40 may include, for example, a bolt 36 and a nut 38. The bolt 36 extends through the suspension arm 14, e.g., the vehicle-rearward end 40 or the vehicle-forward end 42, and through the frame 12, e.g., the clevises 66, to rotatably engage the suspension arm 14 to the frame 12.

The bolt 36 includes the shaft 20. The shaft 20 is threaded, and the nut 38 is threadedly engaged with the shaft 20. In one example, the bolt 36 includes the shaft 20, as discussed above, and the nut 38 includes the flange 18, as discussed above, i.e., the washer 22 is disposed on the shaft 20 between the nut 38 and the frame 12, e.g., the clevis 66. In another example, the bolt 36 includes the shaft 20 and a head (not shown) fixed to the shaft 20, and the head includes the flange 18, i.e., the washer 22 is disposed on the shaft 20 between the head and the frame 12, e.g., the clevis 66.

With reference to FIGS. 3A-C, the driver 34 is fixed to and extends from the suspension arm 14. Specifically, the driver 34 extends from the vehicle-rearward end 40 in a vehicle-rearward direction. The driver 34 is positioned to impact the washer 22, e.g., during a vehicle impact. Specifically, as set forth above, during a vehicle impact, e.g., a SORB impact, the suspension arm 14 may be impacted and rotated relative to the frame 12 about the vehicle-rearward end 40, i.e., counter-clockwise in the view shown in FIGS. 3A-C. The driver 34 is positioned to drive the washer 22 in a vehicle-inboard direction D during this rotation of the suspension arm 14 to break the fastener 16, as described further below. In other words, the driver 34 is positioned relative to the washer 22 such that the washer 22 is in the path of travel of the driver 34 during rotation of the suspension arm 14, e.g., the anticipated path that the suspension arm 14 will travel during a vehicle impact, such as a SORB impact.

Figure 4B:
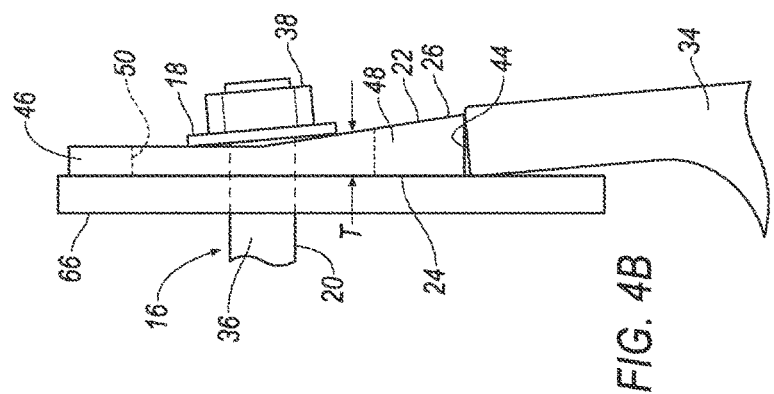
FIG. 4B is the top view of FIG. 4A during a vehicle impact with a washer being forced in a vehicle-inboard direction by a driver.
Figure 4A:
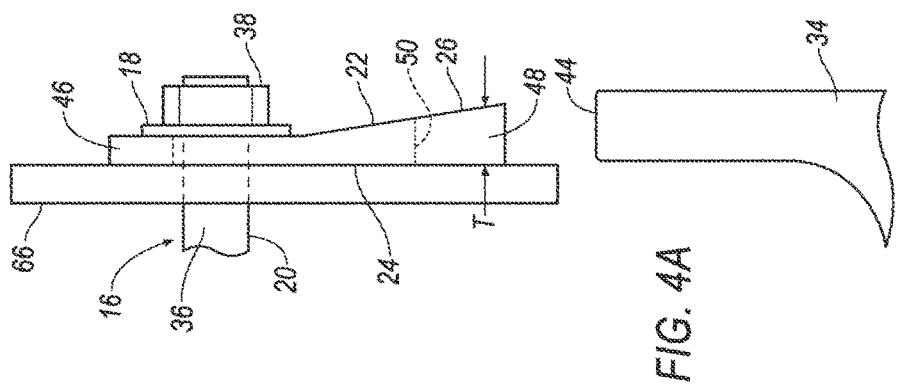
FIG. 4A is a top view of a portion of the suspension system at a vehicle-rearward end of the suspension arm during standard operation.

The driver 34, for example, may directly contact the washer 22 to drive the washer 22 in the vehicle-inboard direction D. With reference to FIGS. 3A and 4A, the driver 34 may be spaced from the washer 22 during standard operation, i.e., before being impacted. Alternatively, the driver 34 may be in contact with the washer 22 during standard operation. In both examples, the driver 34 moves with the suspension arm 14 and pushes the washer 22 in the vehicle-inboard direction D when the suspension arm 14 is rotated during an impact.

The driver 34 may be formed separately from the suspension arm 14 and fixed to the suspension arm 14, e.g., by welding, with fasteners, etc. As another example, the driver 34 and the suspension arm 14 may be integral, i.e., formed together simultaneously as a single continuous unit, e.g., by molding, forging, casting, etc. The driver 34 and the washer 22 may be configured such that the driver 34 and the washer 22 are rigid, e.g., do not deform, at the point of contact between the driver 34 and the washer 22 when the driver 34 drives the washer 22 during impact. For example, the driver 34 and the washer 22 may be formed of materials and/or may be sized and/or shaped to limit or prevent deformation between the driver 34 and the washer 22. The driver 34 and the washer 22, for example, may be formed of metal, e.g., steel.

As set forth above, the thickness T of the washer 22 tapers. Specifically, with reference to FIGS. 3A-4C, the thickness T of the washer 22 tapers, i.e., thins, in a vehicle-inboard direction D. The washer 22 includes an impact end 44 positioned to be impacted by the driver 34 during the vehicle impact. The thickness T of the washer 22 tapers in a direction from the impact end 44 toward the flange 18. Accordingly, as the washer 22 is driven in the vehicle-inboard direction D, the washer 22 gradually increases tensile stress on the fastener 16 until the fastener 16 breaks.

The washer 22 may include a flat portion 46 and a wedge portion 48. The thickness T of the washer 22 is substantially constant along the flat portion 46. During standard operation, i.e., before impact, the flat portion 46 is between the flange 18 and the frame 12. The thickness T of the washer 22 tapers along the wedge portion 48.

With continued reference to FIGS. 3A-4C, the first surface 24 of the washer 22 may abut the frame 12, and the second surface 26 of the washer 22 may abut the flange 18. As another example, one or more intermediate components may be disposed between the first surface 24 and the frame 12 and/or the second surface 26 and the flange 18.

With continued reference to FIGS. 3A-4C, the washer 22 includes a slot 50 receiving the shaft 20 of the fastener 16. The slot 50 is elongated along an axis, and the axis extends generally in the vehicle-inboard direction D. In other words, the slot 50 is elongated generally in the vehicle-inboard direction D. The thickness T of the washer 22 tapers in a direction along the axis. The slot 50 is disposed on the flat portion 46 and the wedge portion 48. Accordingly, the flange 18 abuts the flat portion 46 in standard operation, and when the fastener 16 slides along the slot 50 as the wedge portion 48 engages the flange 18.

Figure 6:
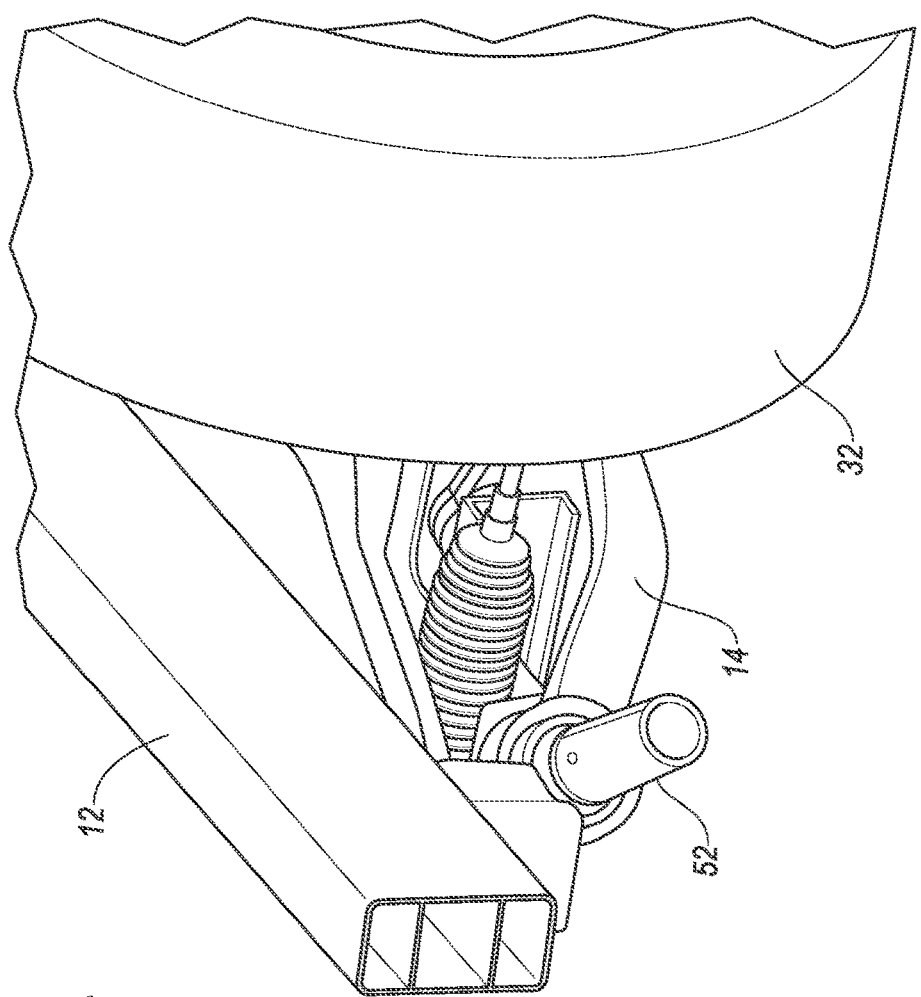
FIG. 6 is a cut-away view of a portion of the vehicle showing an example of a fastener on a front-end of the suspension arm.
Figure 7:
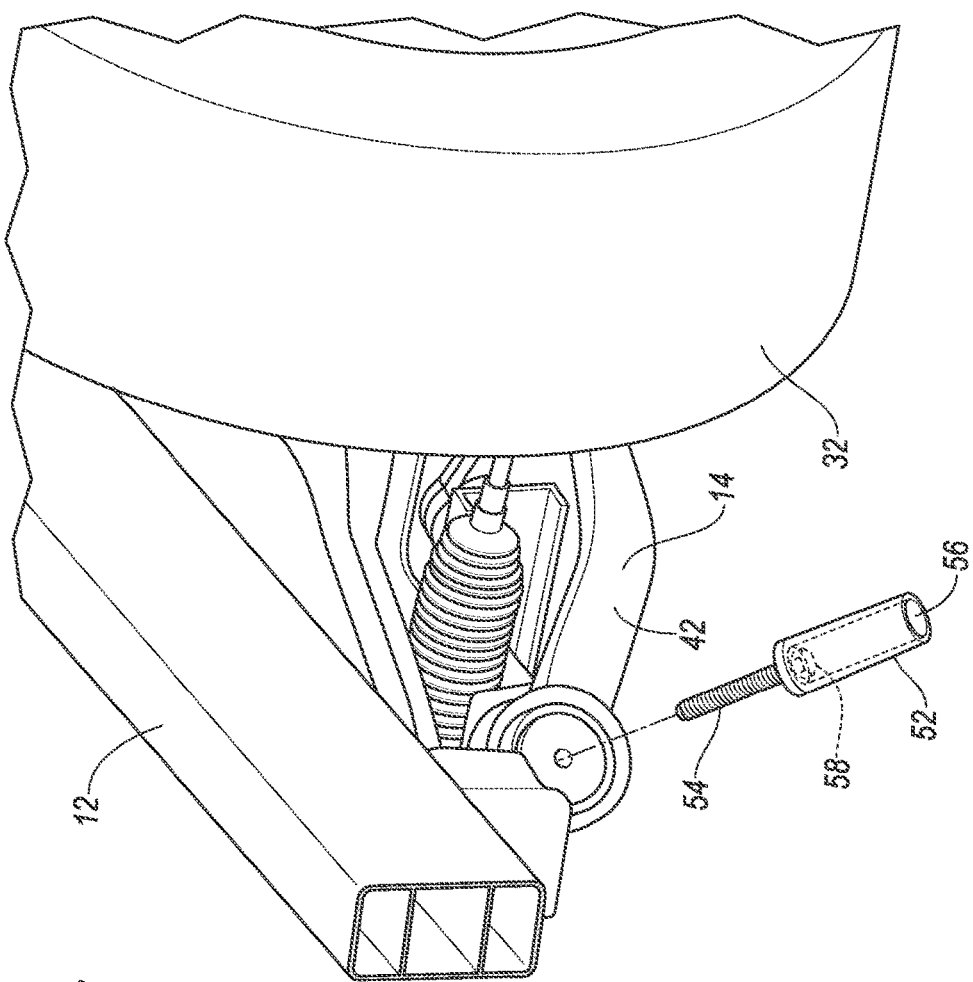
FIG. 7 is a partially exploded view of FIG. 6.
Figure 8:
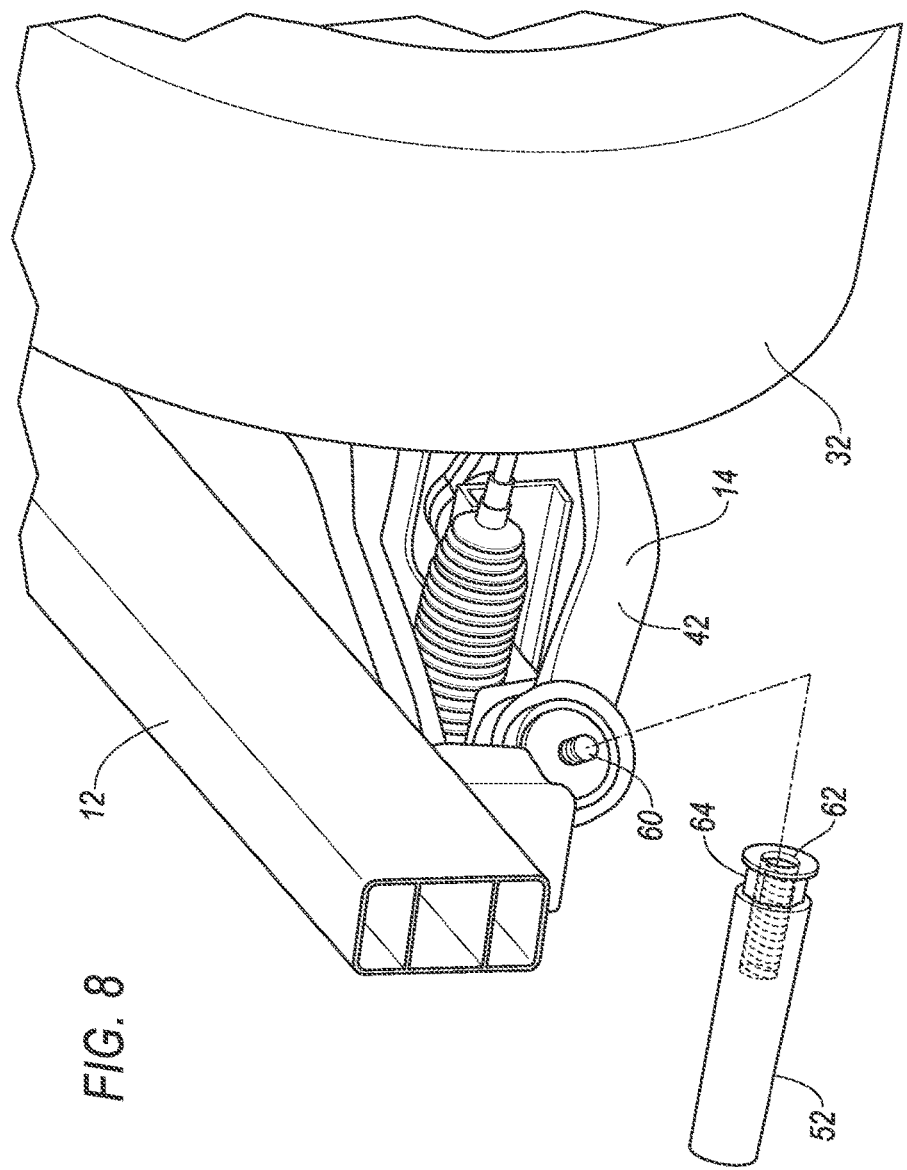
FIG. 8 is a partially exploded view of a portion of the vehicle including another example of the fastener on the front-end of the suspension arm.
Figure 9:
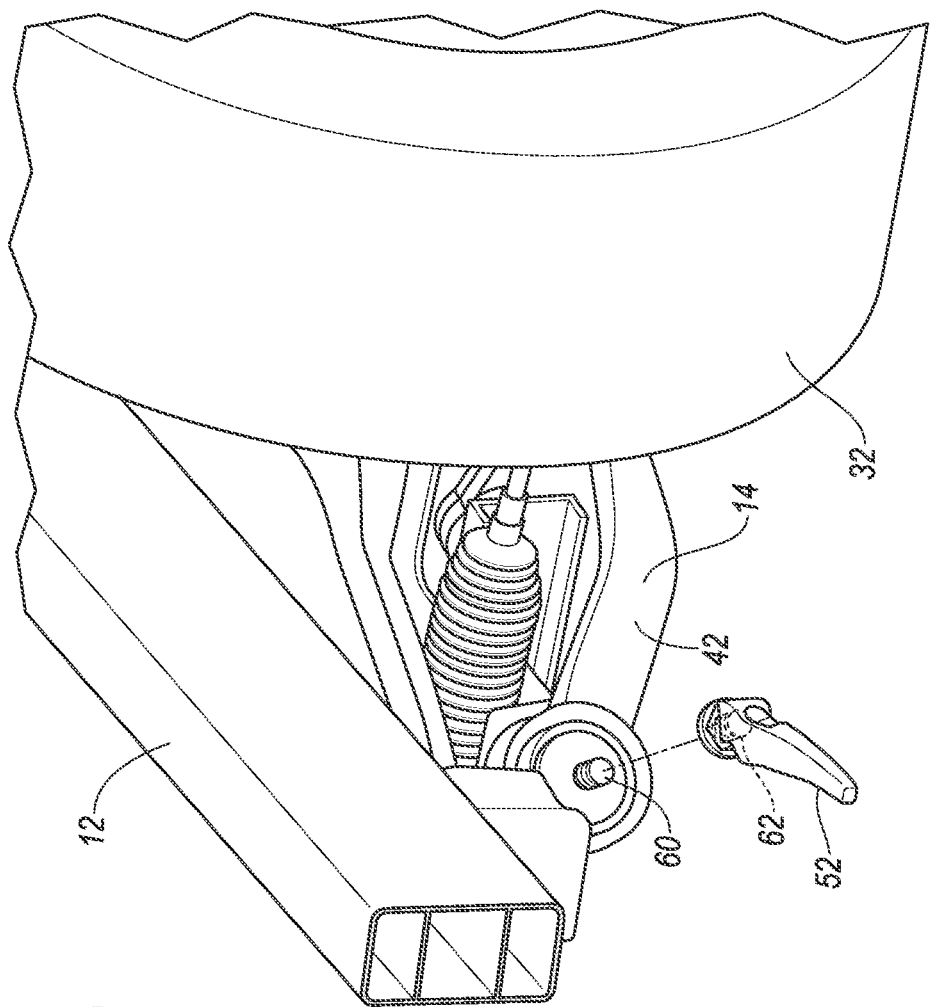
FIG. 9 is a partially exploded view of a portion of the vehicle including another example of the fastener on the front-end of the suspension arm.

As set forth above, the fastener 17 on the vehicle-forward end 42 of the suspension arm 14 may be designed to break during an impact to allow the suspension arm 14 to rotate about the vehicle-rearward end 40. One example of the fastener 17 is shown in FIGS. 5A-C, another example of the fastener 17 is shown in FIGS. 6-7, another example of the fastener 17 is shown in FIG. 8, and another example of the fastener 17 is shown in FIG. 8. In the alternative, the fastener 17 on the vehicle-forward end 42 of the suspension arm 14 may be of any suitable type that breaks during an impact to allow the suspension arm 14 to rotate about the vehicle-rearward end 40. With reference to FIGS. 5A-C, the fastener 17 may be identical to the fastener 16 of the vehicle-rearward end 40 described above. Specifically, the fastener 17 may include a flange 19 and a shaft 21 extending from the flange 19. Specifically, the fastener 17 at the vehicle-forward end 42 may include, for example, a bolt 37 and a nut 39. The bolt 37 extends through the suspension arm 14, e.g., the vehicle-rearward end 40 or the vehicle-forward end 42, and through the frame 12, e.g., the clevises 66, to rotatably engage the suspension arm 14 to the frame 12. The bolt 37 includes the shaft 21. The shaft 21 is threaded, and the nut 39 is threadedly engaged with the shaft 21. In one example, the bolt 37 includes the shaft 21, as discussed above, and the nut 39 includes the flange 19, as discussed above, i.e., the washer 22 is disposed on the shaft 21 between the nut 39 and the frame 12, e.g., the clevis 66. In another example, the bolt 37 includes the shaft 21 and a head (not shown) fixed to the shaft 21, and the head includes the flange 19, i.e., the washer 22 is disposed on the shaft 21 between the head and the frame 12, e.g., the clevis 66.

With continued reference to FIGS. 5A-C, a driver 37 is fixed to and extends from the suspension arm 14. Specifically, the driver 37 extends from the vehicle-forward end 42 in a vehicle-forward direction. The driver 37 is positioned to impact the washer 22, e.g., during a vehicle impact. Specifically, as set forth above, during a vehicle impact, e.g., a SORB impact, the suspension arm 14 may be impacted and rotated relative to the frame 12 about the vehicle-rearward end 40, i.e., counter-clockwise in the view shown in FIGS. 5A-C.

The driver 37 includes an end (not numbered) that is adjacent to the washer 22, i.e., the lack of anything therebetween. For example, the end of the driver 37 may abut the washer 22, as shown in FIG. 5A. As shown in FIG. 5B, during a vehicle impact, the suspension arm 14 rotates, which drives the driver 37 against the washer 22. This moves the washer 22 in a vehicle-outboard direction. As the driver 37 moves the washer 22 relative to the clevis 66, as shown in FIGS. 5B-C, the washer 22 applies tensile forces on the fastener 17, which ultimately breaks the fastener 17, as shown in FIG. 5. This allows the suspension arm 14 to continue to rotate relative to the frame 12 about the vehicle-rearward end 40. The operation of the driver 34 to move the respective washer 22 described above may occur simultaneously with, or after, the operation of the driver 37 to move the respective washer 22.

As another example, with reference to FIGS. 6-9, the fastener 17 may include an elongated extension 52 that extends from the vehicle-forward end 42 generally in a vehicle-forward direction. During an impact, e.g., a SORB impact, the elongated extension 52 may be impacted. When impacted with sufficient force, the elongated extension 52 applies a bending moment to the rest of the fastener 17, which exerts bending forces and/or tensile forces that cause the fastener 17 to break. When the fastener 17 breaks, the vehicle-forward end 42 of the suspension arm 14 separates from the frame 12, allowing the suspension arm 14 to rotate relative to the frame 12 about the vehicle-rearward end 40.

With reference to FIGS. 6 and 7, the fastener 17 may include a threaded shaft 54 that extends from the elongated extension 52 through the vehicle-forward end 42 of the suspension arm 14 and through the frame 12, e.g., the clevises 66. In this configuration, the fastener 17 includes a threaded nut (not shown) that threadedly engages the threaded shaft 54 to retain the fastener 16 to the suspension arm 14 and the frame 12. The elongated extension 52 and the threaded shaft 54 may be fixed relative to each other and may be monolithic.

As shown in FIG. 7, the elongated extension 52 may include a bore 56 and a head 58 in the bore 56. The head 58 may be designed to be engageable with a tool to hold and/or rotate the threaded shaft 54 for engagement with the nut. The head 58 may be, for example, a hexagonal head that is engageable with a rotary driver, e.g., an impact wrench or other manufacturing process.

In the configuration shown in FIGS. 6 and 7, when the elongated extension 52 is impacted with sufficient force during a vehicle impact, the elongated extension 52 applies a bending moment to the rest of the fastener 17. Specifically, the bending moment causes stress in the elongated extension 52 and/or the threaded shaft 54, which results in failure of the fastener 17 at the threaded shaft 54 and/or at the nut. As set forth above, failure of the fastener 17 releases the vehicle-forward end 42 of the suspension arm 14, allowing the suspension arm 14 to rotate about the vehicle-rearward end 40.

As another example, as shown in FIG. 8, the fastener 17 may include a threaded shaft 60 extending through the vehicle-forward end 42 of the suspension arm 14 and through the frame 12, e.g., the clevises 66, and the elongated extension 52 may include a threaded bore 62 that threadedly engages the threaded shaft 60. For example, the fastener 17 may include a bolt having the threaded shaft 60 and a head (not shown). The head and the elongated extension 52 retain the fastener 17 to the suspension arm 14 and the frame 12 when the elongated extension 52 is threadedly engaged with the threaded bore 62. With continued reference to FIG. 8, the elongated extension 52 may include a neck 64 designed to be engageable with a tool to hold and/or rotate the elongated extension 52 relative to the threaded shaft 60 to threadedly engage the elongated extension 52 and the threaded shaft 60.

As another example, as shown in FIG. 8, the elongated extension 52 may have a horn-shape. The horn-shape of the elongated extension 52 curves from the vehicle-forward end 42 toward a vehicle-forward direction to increase the bending moment caused by the elongated extension 52 when impacted.

During a vehicle impact, e.g., a SORB impact like that shown in FIG. 2, the vehicle-forward end 42 of the suspension arm 14 is impacted and the fastener 17 at the vehicle-forward end 42 breaks, e.g., as caused by a bending moment from the elongated extension 52. When the fastener 17 at the vehicle-forward end 42 breaks, the suspension arm 14 is further rotated, as shown in FIGS. 3B and 3C. As the suspension arm 14 rotates, the driver 34 forces the washer 22 in the vehicle-inboard direction D, as shown in FIGS. 4B and 4C. As the washer 22 is driven in the vehicle-inboard direction D by the driver 34, the wedged portion of the washer 22 creates tensile stresses in the threaded shaft 20 and the nut 38, until the fastener 16 breaks, e.g., the threaded shaft 20 and/or the nut 38 breaks, as shown in FIGS. 3C and 4C. When the fastener 16 breaks, the vehicle-rearward end 40 of the suspension arm 14 is released from the frame 12, which allows the suspension arm 14 and the wheel 32 to move away from the wheel 32 well to reduce the likelihood of intrusion into the occupant cabin of the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
    a frame;
    a suspension arm;
    a fastener including a flange and a shaft extending from the flange, the shaft engaging the frame and the suspension arm; and
    a washer on the shaft, the washer having a first surface facing the frame and a second surface facing the flange, the washer having a thickness from the first surface to the second surface, and the thickness tapers.

2. The vehicle as set forth in claim 1, further comprising a driver positioned to impact the washer.

3. The vehicle as set forth in claim 2, wherein the driver is fixed to and extends from the suspension arm.

4. The vehicle as set forth in claim 2, wherein the washer includes an impact end positioned to be impacted by the driver during a vehicle impact, and the thickness of the washer tapers in a direction from the impact end toward the flange.

5. The vehicle as set forth in claim 2, wherein the driver is spaced from the washer.

6. The vehicle as set forth in claim 2, wherein the suspension arm has a vehicle-rearward end and the driver extends from the vehicle-rearward end.

7. The vehicle as set forth in claim 1, wherein the washer includes a flat portion between the flange and the frame, and the thickness is substantially constant along the flat portion.

8. The vehicle as set forth in claim 1, wherein the first surface abuts the frame.

9. The vehicle as set forth in claim 1, wherein the second surface abuts the flange.

10. The vehicle as set forth in claim 1, wherein the fastener includes a bolt including the shaft, and a nut including the flange.

11. The vehicle as set forth in claim 1, wherein the fastener includes a head, and the head includes the flange.

12. The vehicle as set forth in claim 1, wherein the washer includes a slot receiving the shaft of the fastener.

13. The vehicle as set forth in claim 12, wherein the slot is elongated along an axis and the thickness of the washer tapers in a direction along the axis.

14. The vehicle as set forth in claim 12, wherein the washer includes a flat portion and a wedge portion, the flat portion being between the frame and the flange, and the thickness being substantially constant along the flat portion and tapering along the wedge portion, and the slot being disposed on the flat portion and the wedge portion.

* * * * *